United States Patent
Fujino et al.

(10) Patent No.: US 8,502,900 B2
(45) Date of Patent: Aug. 6, 2013

(54) DIGITAL CAMERA AND INTERCHANGEABLE LENS UNIT

(75) Inventors: Shinkuro Fujino, Kyoto (JP);
Hirotsugu Fusayasu, Kyoto (JP);
Shouichi Mimura, Osaka (JP);
Masafumi Kumoi, Osaka (JP); Masato Tobinaga, Hyogo (JP); Akihiro Aoyama, Osaka (JP); Yasuhiro Wada, Osaka (JP)

(73) Assignee: Panasonic Corporation, Osaka (JP)

(*) Notice: Subject to any disclaimer, the term of this patent is extended or adjusted under 35 U.S.C. 154(b) by 21 days.

(21) Appl. No.: 13/254,016

(22) PCT Filed: Jan. 13, 2011

(86) PCT No.: PCT/JP2011/000124
§ 371 (c)(1),
(2), (4) Date: Aug. 31, 2011

(87) PCT Pub. No.: WO2011/086916
PCT Pub. Date: Jul. 21, 2011

(65) Prior Publication Data
US 2011/0317062 A1    Dec. 29, 2011

(30) Foreign Application Priority Data
Jan. 14, 2010    (JP) .................................. 2010-005468

(51) Int. Cl.
*H04N 5/335*    (2011.01)
(52) U.S. Cl.
USPC ....................................................... 348/308
(58) Field of Classification Search
USPC .................... 348/360, 373, 374; 396/71, 532
See application file for complete search history.

(56) References Cited

U.S. PATENT DOCUMENTS

| | | | | |
|---|---|---|---|---|
| 5,274,413 A | * | 12/1993 | Nomura et al. | 396/529 |
| 6,738,198 B2 | * | 5/2004 | Kashiwaba et al. | 359/704 |
| 2005/0212949 A1 | * | 9/2005 | Tokiwa et al. | 348/340 |
| 2006/0216023 A1 | * | 9/2006 | Tokiwa et al. | 396/532 |

FOREIGN PATENT DOCUMENTS

| | | |
|---|---|---|
| JP | 60-023841 A | 2/1985 |
| JP | 2006-267697 A | 10/2006 |
| JP | 2007-288359 A | 11/2007 |
| JP | 2008-046332 A | 2/2008 |

OTHER PUBLICATIONS

International Search Report for PCT/JP2011/000124, Feb. 15, 2011.

* cited by examiner

*Primary Examiner* — Aung S Moe
*Assistant Examiner* — Amy Hsu
(74) *Attorney, Agent, or Firm* — RatnerPrestia

(57) ABSTRACT

A circuit board is arranged on an end face of a lens barrel on a lens mount side and installed with an electronic circuit device, a plurality of connection terminals which are arranged in an electrically insulating state in the lens mount and serve to connect the electronic circuit device on the circuit board with an electronic circuit device inside a camera body, and a wiring member is for connecting the plurality of connection terminals with the circuit board, where the wiring member is provided with a ground connection section which is connected to a ground pattern of the circuit board and also electrically connected to a connection terminal that is to be a ground terminal among the plurality of connection terminals, and an extended wiring pattern is for electrically grounding the ground connection section on a metal portion of the lens mount.

7 Claims, 7 Drawing Sheets

DIGITAL CAMERA AND INTERCHANGEABLE LENS UNIT

This application is a U.S. national phase application of PCT international application no. PCT/JP2011/000124.

TECHNICAL FIELD

The present invention relates to a lens interchangeable digital camera and an interchangeable lens unit.

BACKGROUND ART

A digital camera has a configuration where a picked-up photographed image is converted to image data of a digital signal by use of an imaging device such as an image sensor, and the data is recorded in a recording medium such as a built-in memory or a memory card. Further, among digital cameras, there is a lens interchangeable digital camera called a single-lens digital camera, with such a configuration where a variety of lenses are interchangeable according to user's preferences.

In this lens interchangeable digital camera, since a lens is arranged in a central section of a cylindrical lens barrel of an interchangeable lens unit, an electronic circuit device for controlling movement of the lens and the like has a structure of being mounted on a circuit board in a ring shape or in a shape like a partially missing ring shape.

As thus described, in the lens interchangeable digital camera, although the electronic circuit device mounted on the ring-shaped circuit board is installed in the cylindrical lens barrel of the interchangeable lens unit, since the circuit board is formed in the ring shape and thus has a small area, it is difficult to expand an area of a ground pattern of the circuit board. As a result, a ground potential of the electronic circuit device becomes unstable, thereby causing a problem of an influence exerted by an unwanted radiation noise from the electronic circuit device.

In recent years, a lens interchangeable digital camera capable of photographing high-definition moving pictures has attracted much attention. In order for the digital camera to be capable of photographing high-definition moving pictures, it is necessary to increase the number of times of autofocus operations per unit time, which leads to a higher speed of a digital signal, namely a higher cyclic frequency of the signal, the digital signal flowing through the circuit board of the electronic circuit device installed in the interchangeable lens unit. As a result, the influence exerted by the unwanted radiation noise becomes more problematic.

Meanwhile, as described in Patent Document 1, there is known a configuration where in an interchangeable lens unit, a printed board mounted with a CCD drive circuit is screwed to a lens barrel so as to be grounded thereon, thereby suppressing generation of unwanted radiation due to a clock signal generated from the CCD drive circuit.

PRIOR ART DOCUMENT

Patent Document

Patent Document 1: Unexamined Japanese Patent Publication No. 2008-46332

DISCLOSURE OF THE INVENTION

The present invention is a digital camera having: a camera body provided with a body mount; and an interchangeable lens unit in which a metal-made lens mount fitted to the body mount is attached to a lens barrel, wherein the interchangeable lens unit is provided with a circuit board arranged on an end face of the lens barrel on a lens mount side and installed with an electronic circuit device, a plurality of connection terminals which are arranged in an electrically insulating state in the lens mount, and serve to connect the electronic circuit device on the circuit board with an electronic circuit device inside the camera body, and a wiring member for connecting the plurality of connection terminals with the circuit board, and the wiring member is provided with a ground connection section which is connected to a ground pattern of the circuit board, and also electrically connected to a connection terminal that is to be a ground terminal among the plurality of connection terminals, and an extended wiring pattern for electrically grounding the ground connection section on a metal portion of the lens mount.

Further, the present invention is an interchangeable lens unit in which a metal-made lens mount fitted to a body mount of a camera body is attached to a lens barrel, including: a circuit board arranged on an end face of the lens barrel on a lens mount side and installed with an electronic circuit device; a plurality of connection terminals which are arranged in an electrically insulating state in the lens mount, and serve to connect the electronic circuit device on the circuit board with an electronic circuit device inside the camera body; and a wiring member for connecting the plurality of connection terminals with the circuit board, wherein the wiring member is provided with a ground connection section which is connected to a ground pattern of the circuit board, and also electrically connected to a connection terminal that is to be a ground terminal among the plurality of connection terminals, and an extended wiring pattern for electrically grounding the ground connection section on a metal portion of the lens mount.

With this configuration, the ground pattern of the circuit board installed with the electronic circuit device and the ground terminal of the connection terminal are electrically grounded on the metal portion of the lens mount through the ground connection section and the extended wiring pattern which are provided in the wiring member, and hence a ground potential in the electronic circuit device of the interchangeable lens unit can be brought into a stable state, thereby to reduce unwanted radiation noise based on the instability of the ground potential.

PREFERRED EMBODIMENTS FOR CARRYING OUT OF THE INVENTION

Hereinafter, a digital camera and an interchangeable lens unit according to an embodiment of the present invention are described with reference to the drawings.

Figure 1:
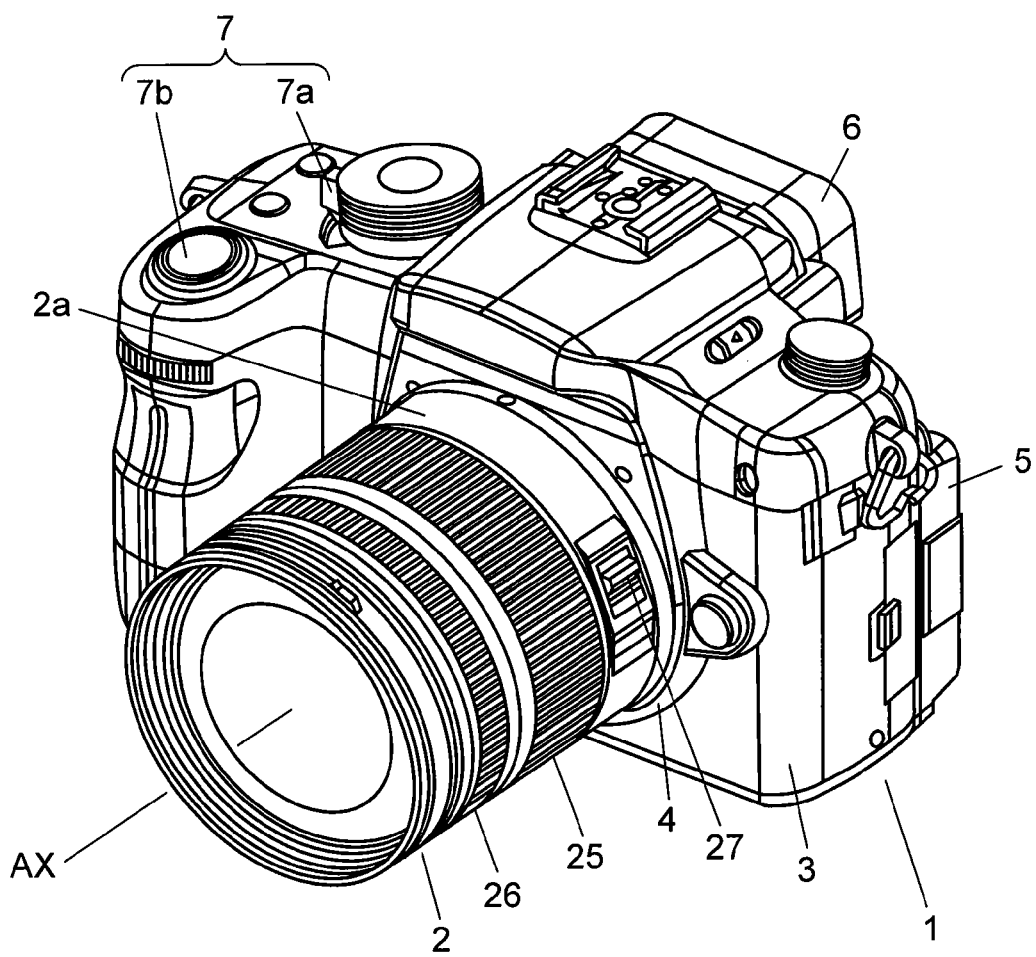
FIG. 1 is a perspective view showing an external view of a digital camera according to an embodiment of the present invention.
Figure 2:
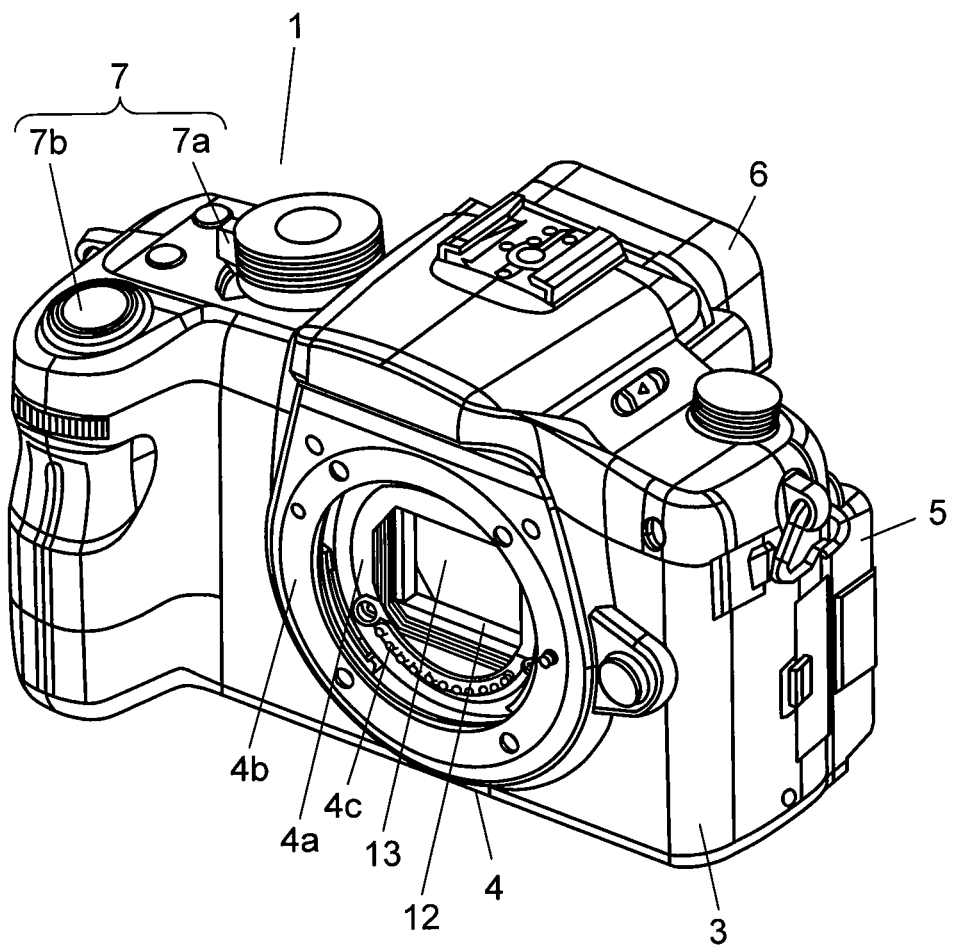
FIG. 2 is a perspective view showing a camera body with an interchangeable lens unit removed therefrom.
Figure 3:
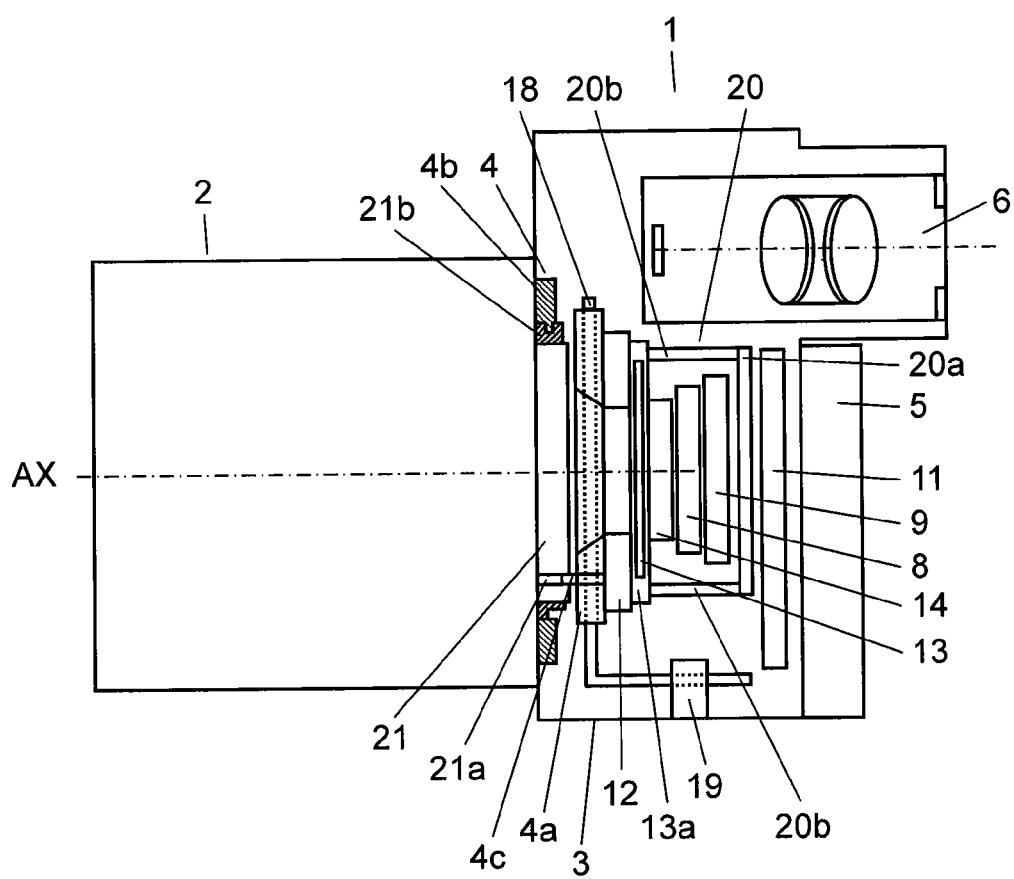
FIG. 3 is a schematic sectional view of the digital camera.
Figure 4:
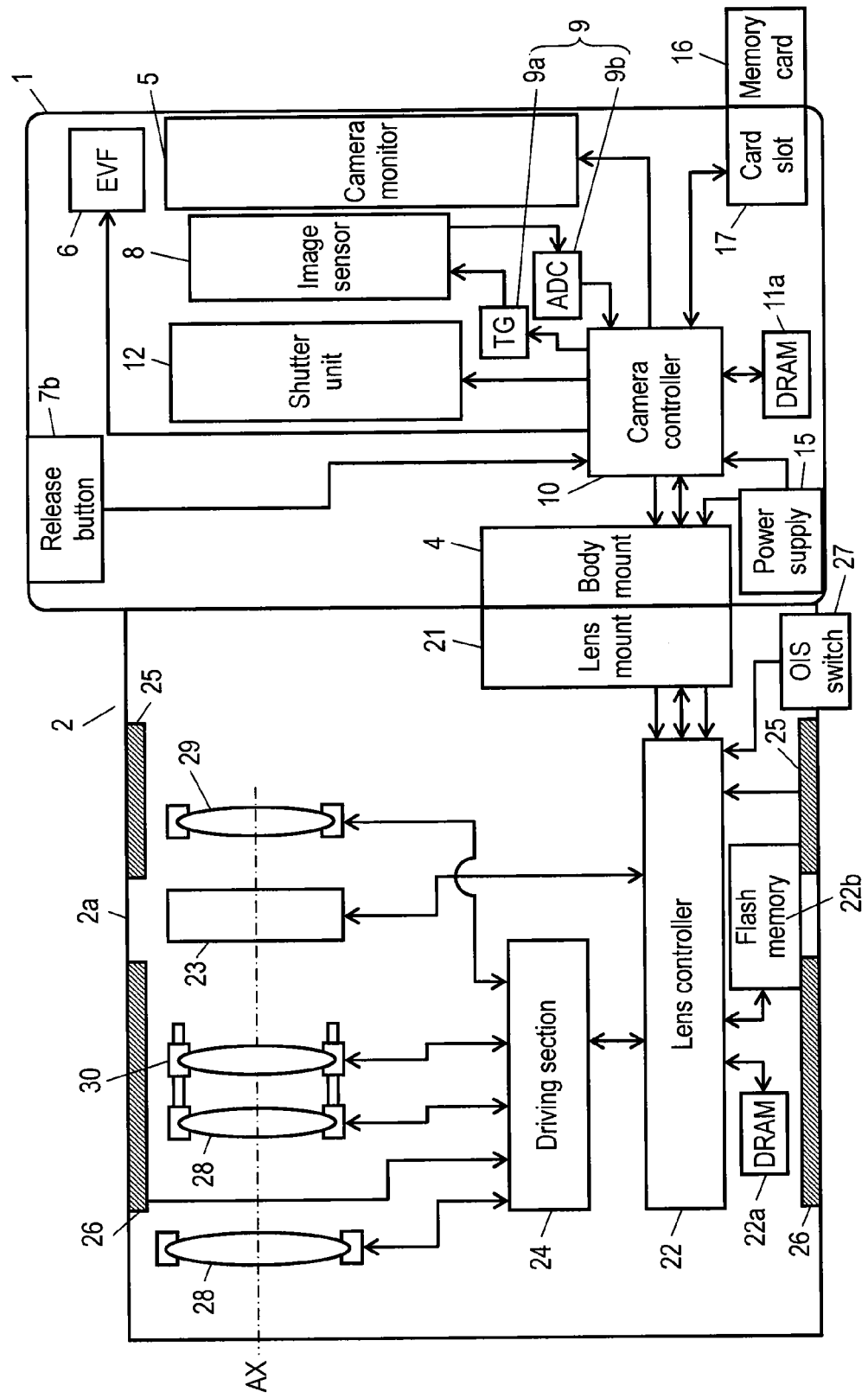
FIG. 4 is a function block diagram of the digital camera.

FIG. 1 is a perspective view showing an external view of a digital camera according to an embodiment of the present invention, FIG. 2 is a perspective view showing a camera body with an interchangeable lens unit removed therefrom, FIG. 3 is a schematic sectional view of the digital camera, and FIG. 4 is a function block diagram of the digital camera.

As shown in FIGS. 1 to 4, the digital camera according to the present invention is provided with camera body 1 and interchangeable lens unit 2 which is mountable on camera body 1.

Camera body 1 is provided with: body housing 3; body mount 4 which is arranged on the front face side of this body housing 3 and on which interchangeable lens unit 2 is mountable; camera monitor 5 arranged on the back face side of body housing 3 and made up of a liquid crystal display or the like; electronic view finder (hereinafter referred to as EVF) 6 which is arranged on the back face side of the body housing 3 and displays an image shown by image data for display, and the like; and operating section 7 arranged on top of body housing 3 and made up of power supply switch 7a, release button 7b that accepts a shutter operation by a user, and the like.

Further, body housing 3 is accommodated therein with: circuit board 9 mounted with CMOS (Complementary Metal Oxide Semiconductor) image sensor 8; main circuit board 11 including camera controller 10; shutter unit 12, vibrating plate 13 and optical low-pass filter 14 which are arranged ahead of image sensor 8; power supply block 15 which is made up of a battery or the like and supplies power to each section such as body mount 4 and camera controller 10; and card slot 17 which inputs and outputs still image data and moving image data into and from mounted memory card 16 based on a control signal transmitted from camera controller 10.

It is to be noted that in FIG. 3, metal-made main frame 18 arranged inside body housing 3 is connected with terminal support section 4a of body mount 4, and supports interchangeable lens unit 2 via body mount 4. Further, tripod installation section 19 having a screw hole for attachment of a tripod is mechanically connected to main frame 18, and the screw hole is exposed on the under face of body housing 3. Moreover, metal-made radiation member 20 arranged so as to surround circuit board 9 mounted with image sensor 8 is a member for promoting radiation of heat generated by image sensor 8, and has radiation plate 20a arranged between circuit board 9 and main circuit board 11, and heat transfer section 20b that transfers heat of radiation plate 20a to the body mount 4 side.

Herein, camera body 1 is arranged with body mount 4, shutter unit 12, vibrating plate 13, optical low-pass filter 14, image sensor 8, circuit board 9, radiation member 20, main circuit board 11, and camera monitor 5, sequentially from the front.

Next, a principal part of camera body 1 is described in detail.

First, as shown in FIGS. 2 and 3, body mount 4 is a part for mounting interchangeable lens unit 2 on camera body 1, and is mechanically and electrically connected with lens mount 21 of interchangeable lens unit 2. This body mount 4 has metal-made body mount ring 4b in ring shape, which is attached to the front face of body housing 3, and connection terminals 4c provided in terminal support section 4a. These connection terminals 4c are electrically connected with connection terminals 21a provided in lens mount 21 by mounting of interchangeable lens unit 2 on camera body 1.

Body mount ring 4b of body mount 4 is fitted with metal-made lens mount ring 21b of lens mount 21 provided in interchangeable lens unit 2, thereby to mechanically hold interchangeable lens unit 2 in camera body 1. Lens mount ring 21b is embedded into body mount ring 4b by a so-called bayonet mechanism. Specifically, lens mount ring 21b takes a first state of not being fitted with body mount ring 4b and a second state of being fitted with body mount ring 4b in accordance with a rotating positional relation with body mount ring 4b around an optical axis. In the first state, lens mount ring 21b is movable in a direction of the optical axis with respect to body mount ring 4b, and is insertable into body mount ring 4b. When lens mount ring 21b in the state of being inserted in body mount ring 4b is rotated with respect to body mount ring 4b, lens mount ring 21b is fitted to body mount ring 4b. The rotating positional relation between body mount ring 4b and lens mount ring 21b at this time is in the second state.

Further, in the state of interchangeable lens unit 2 being mounted on camera body 1, connection terminals 4c are in electrical contact with connection terminals 21a of lens mount 21. In this manner, body mount 4 and lens mount 21 can be electrically connected to each other via connection terminals 4c of body mount 4 and connection terminals 21a of lens mount 21. Therefore, in the digital camera, at least either data or a control signal can be transferred and received between camera body 1 and interchangeable lens unit 2 via body mount 4 and lens mount 21. Specifically, body mount 4 and lens mount 21 can transfer and receive at least either data or a control signal between camera controller 10 and lens controller 22 included in interchangeable lens unit 2. Further, body mount 4 supplies electrical power, received from power supply block 15, to the whole of interchangeable lens unit 2 via lens mount 21.

Next, image sensor 8 is one which converts a subject image as an optical image of a subject, which is incident via interchangeable lens unit 2, to image data, and operates based on a timing signal from a timing signal generator (TG) 9a installed on circuit board 9. The generated image data such as still image data and moving image data is converted to a digital signal in AD converter (ADC) 9b installed on circuit board 9, and subjected to a variety of image processing in camera controller 10. The variety of image processing mentioned here are, for example, gamma correction processing, white balance correction processing, flaw correction processing, YC conversion processing, electronic zoom processing, a JPEG compression processing, and some other processing. It should be noted that the function of circuit board 9 may be mounted on main circuit board 11.

The moving image data acquired in image sensor 8 is also used for display of a through image. Herein, the through image is an image whose data is not recorded in memory card 16 among moving image data, and is displayed on camera monitor 5 and/or EVF 6 for deciding a composition of a moving image or a still image.

Next, camera controller 10 is mounted on main circuit board 11, controls each section of camera body 1, and also transmits a signal for controlling interchangeable lens unit 2 to lens controller 22 via body mount 4 and lens mount 21, to indirectly control each section of interchangeable lens unit 2.

Further, camera controller 10 receives a variety of signals from lens controller 22 via body mount 4 and lens mount 21. Camera controller 10 uses, as a work memory, DRAM 11a which is installed on main circuit board 11 at the time of a control operation or an image processing operation.

Next, shutter unit 12 is a so-called focal plane shutter, which is arranged between body mount 4 and image sensor 8, and can block light to image sensor 8. Shutter unit 12 has a back curtain, a front curtain, and a shutter support frame provided with an opening, through which light is guided from the subject to image sensor 8, and makes the back curtain and the front curtain proceed and retreat to and from the opening of the shutter support frame, to control exposure time of image sensor 8.

Next, vibrating plate 13 is one which is arranged ahead image sensor 8 and supported by vibrating plate support section 13a, and prevents attachment of dust to image sensor 8. It should be noted that vibrating plate support section 13a is one which supports vibrating plate 13 so as to be arranged in a predetermined position with respect to image sensor 8, and is supported by main frame 18 via body mount 4 and shutter unit 12.

Next, optical low-pass filter 14 is one which removes a high frequency component of subject light such that a subject image formed by interchangeable lens unit 2 has a lower resolution than a pixel pitch of image sensor 8. Generally, in an imaging device such as image sensor 8, color filters of RGB colors which are called a Bayer array and complementary color filters of YCM colors are provided in each pixel. Hence, when an image is resolved with one pixel, not only a false color is generated, but also an ugly moire phenomenon occurs in a subject with repeated patterns, and for this reason, optical low-pass filter 14 is arranged. This optical low-pass filter 14 is also provided with an IR cut filter function for cutting infrared rays.

Next, interchangeable lens unit 2 according to the present invention is described. First, a principal function of interchangeable lens unit 2 is described with reference to FIGS. 1 and 4.

Interchangeable lens unit 2 has, inside resin-made lens barrel 2a: an optical system made up of a lens group arranged on optical axis AX for forming an optical image of a subject; lens mount 21 and lens controller 22 which are described above; diaphragm unit 23; and driving section 24 for driving the lens group of the optical system. Further, in a peripheral section of lens barrel 2a, zoom ring 25, focus ring 26 and OIS switch 27 are provided, and zoom ring 25 and focus ring 26 are rotated to allow adjustment of a position of the lens inside lens barrel 2a.

The optical system has: lens group 28 for zooming, which serves to change a focal distance of the optical system; lens group 29 for OIS (Optical Image Stabilizer), which serves to suppress shake of a subject image, formed by the optical system, with respect to image sensor 8; and lens group 30 for focusing, which changes a focused state of the subject image formed by the optical system on image sensor 8. Diaphragm unit 23 is an optical amount adjustment member that adjusts an amount of light passing through the optical system, and specifically has a diaphragm blade capable of shielding part of light beams of light passing through the optical system, and a diaphragm driving section which drives the diaphragm blade. Driving section 24 is one which drives each lens group of the optical system based on a control signal of lens controller 22, and has a detection section for detecting a position of each lens group of the optical system.

Further, lens controller 22 controls the whole of interchangeable lens unit 2 based on a control signal transmitted from camera controller 10. Lens controller 22 receives positional information of each lens group of the optical system, detected by the detection section of driving section 24, and transmits the information to camera controller 10. Camera controller 10 generates a control signal for controlling driving section 24 based on the received positional information, and transmits the signal to lens controller 22. Lens controller 22 transmits the control signal generated by camera controller 10 to driving section 24, and driving section 24 adjusts the positions of lens groups 28, 29, 30 based on the control signal. Meanwhile, camera controller 10 generates a control signal for making diaphragm unit 23 operate based on information such as an amount of light received by image sensor 8, whether to perform still-image photographing or moving-image photographing, whether an operation is being performed so as to preferentially set a diaphragm value. At this time, lens controller 22 relays the control signal generated in camera controller 10 to diaphragm unit 23.

It is to be noted that in the case of driving each of lens groups 28, 29, 30 of the optical system and diaphragm unit 23, lens controller 22 uses DRAM 22a as a work memory, and flash memory 22b stores a program and a parameter which are used by lens controller 22.

Next, an arrangement structure of an electronic circuit device portion including lens controller 22 in interchangeable lens unit 2 is described with reference to FIGS. 5 to 8.

Figure 5:
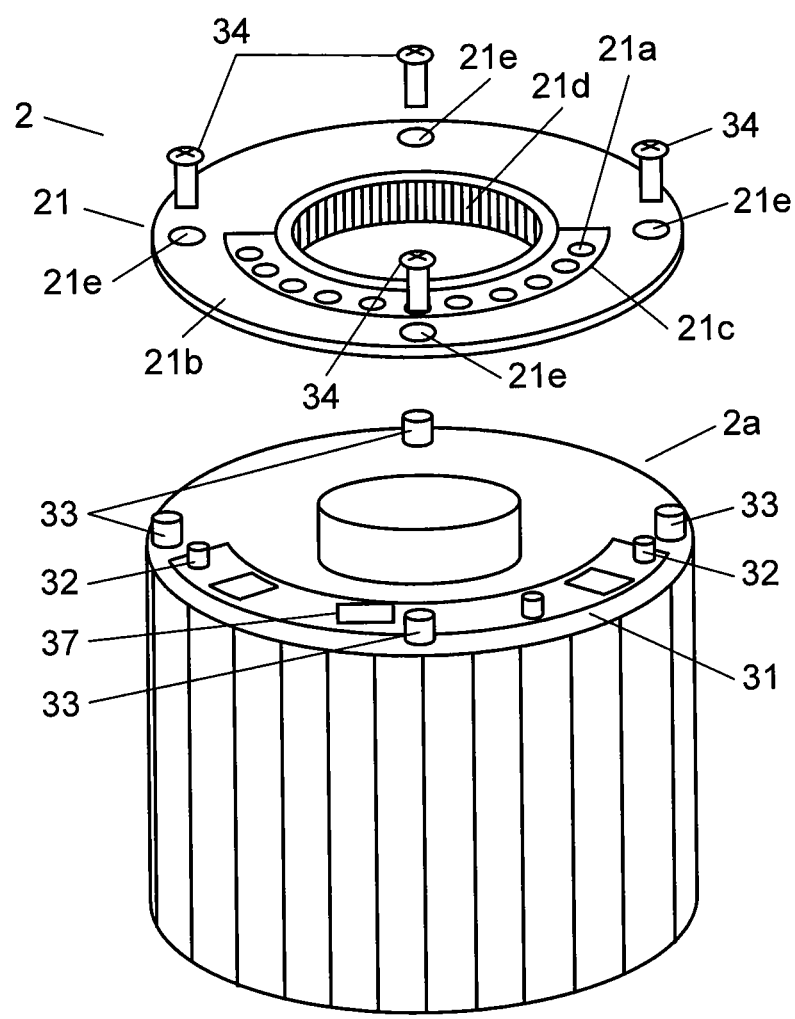
FIG. 5 is an exploded perspective view, seen from the lens mount side, in the interchangeable lens unit according to the present invention.
Figure 6:
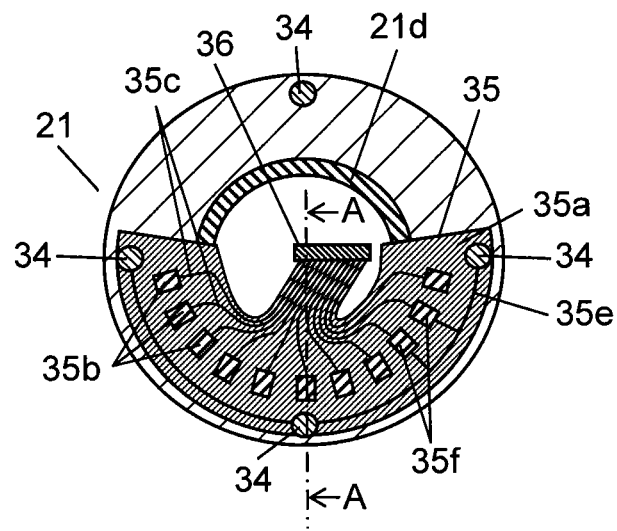
FIG. 6 is a plan view of the lens mount, seen from the lens barrel side, in the interchangeable lens unit according to the present invention.
Figure 7:
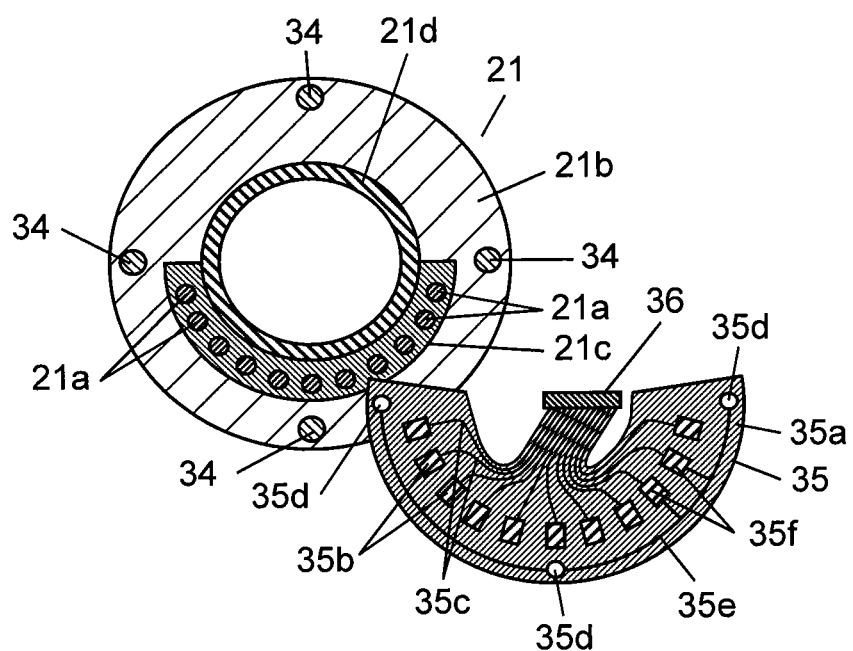
FIG. 7 is a plan view showing a state where a flexible cable as a wiring member has been removed in FIG. 6.
Figure 8:
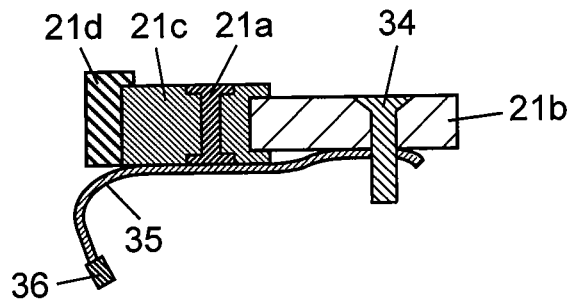
FIG. 8 is a sectional view cut along line A-A of FIG. 6.

FIG. 5 is an exploded perspective view, seen from the lens mount side, in the interchangeable lens unit according to the present invention, FIG. 6 is a plan view of the lens mount, seen from the lens barrel side, in the interchangeable lens unit according to the present invention, FIG. 7 is a plan view showing a state where a flexible cable as a wiring member has been removed in FIG. 6, and FIG. 8 is a sectional view cut along line A-A of FIG. 6.

As shown in FIG. 5, interchangeable lens unit 2 is provided with lens barrel 2a, and lens mount 21 that is attached to the end face of this lens barrel 2a on the camera body 1 side. Further, the end face, to which lens mount 21 of lens barrel 2a is attached, is arranged with circuit board 31 where an electronic circuit device including lens controller 22 that controls lens groups 28, 29, 30 is installed. This circuit board 31 has a ring shape or an almost semilunar shape which is a partially missing ring shape, so as to correspond to lens barrel 2a. Further, circuit board 31 is sandwiched between buffer members 32 respectively provided between circuit board 31 and lens barrel 2a and between circuit board 31 and lens mount 21, thereby to be held on the end face of lens barrel 2a. Buffer member 32 is made up of a material having elasticity such as rubber, and circuit board 31 is elastically supported by buffer members 32, to form such a configuration where a large mechanical impact is not transmitted to circuit board 31 in the case of dropping of interchangeable lens unit 2 or some other case.

Lens mount 21 is provided with metal-made lens mount ring 21b and resin-made terminal section 21c which holds a plurality of connection terminals 21a in a mutually electrically insulating state. The central portion of lens mount 21 is provided with an opening for allowing light having passed through the lens group to be incident on camera body 1, and an inner wall face of the opening is provided with inner edge 21d formed of a black-colored resin material so that the incident light is not reflected. Further, lens mount ring 21b of lens mount 21 is provided with screw holes 21e, and lens mount 21 is fastened with screws 34 to screw receiving sections 33 provided on the end face of lens barrel 2a, so as to be fixed to lens barrel 2a.

As shown in FIGS. 6, 7, 8, the face of lens mount 21 on the lens barrel 2a side is arranged with flexible cable 35 as a semilunar-shaped wiring member so as to correspond to a planar shape of lens mount 21. That flexible cable 35 has such a configuration where terminal connecting sections 35b, obtained by respectively connecting a plurality of connection terminals 21a among insulating films 35a such as polyimide films by soldering or the like, and wiring pattern 35c for connecting this terminal connecting section 35b to connector 36 are formed of a conductive material such as copper. Herein, connector 36 connected to flexible cable 35 is connected to connector 37 mounted on circuit board 31 on the lens barrel 2a side. Thereby, circuit board 31 installed with the electronic circuit device of interchangeable lens unit 2 is electrically connected to main circuit board 11 of camera body 1 through flexible cable 35, connection terminals 21a, and connection terminals 4c of body mount 4 of camera body 1.

Further, in a peripheral section of flexible cable 35, conductive pad 35d, with which screw 34 for fixing lens mount 21 to lens barrel 2a comes into electrical contact, is provided in a portion where screw 34 penetrate, and in the peripheral section of flexible cable 35, extended wiring pattern 35e is provided so as to electrically connect conductive pads 35d. Extended wiring pattern 35e of flexible cable 35 is connected with ground connection section 35f, and that ground connection section 35f is electrically connected with a ground pattern of circuit board 31 via connectors 36, 37, and also electrically connected with connection terminal 21a that is to be a ground terminal among a plurality of connection terminals 21a.

That is, in interchangeable lens unit 2 of the present invention, the ground pattern of circuit board 31 installed with the electronic circuit device and the ground terminal of connection terminal 21a are electrically grounded on the metal portion of lens mount 21 through ground connection section 35f, extended wiring pattern 35e and conductive pad 35d which are provided in flexible cable 35, and screws 34. Therefore, a ground potential in the electronic circuit device of interchangeable lens unit 2 can be brought into a stable state, thereby to reduce unwanted radiation noise based on the instability of the ground potential.

Figure 9:
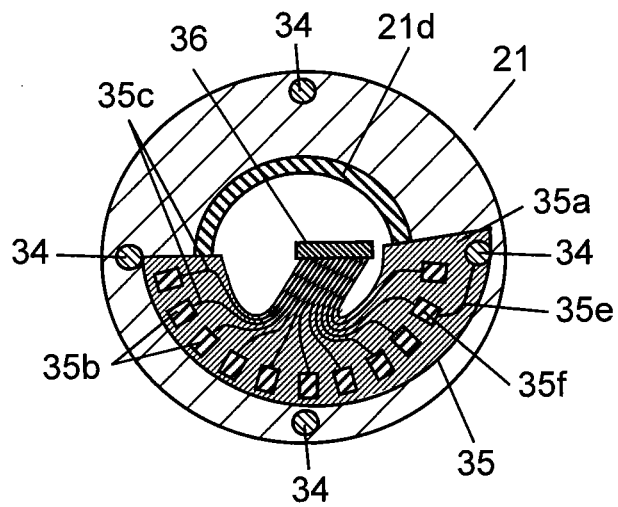
FIG. 9 is a plan view of a lens mount, seen from the lens barrel side, in an interchangeable lens unit according to another embodiment of the present invention.

It should be noted that, although such a configuration has been formed in the embodiment shown in FIGS. 6 to 8 where two ground connection sections 35f are provided in flexible cable 35 and connected to three screws 34 by extended wiring pattern 35e, this configuration is not restrictive. For example, as shown in FIG. 9, such a configuration may be formed where one ground connection section 35f is provided and extended wiring pattern 35e is formed so as to be connected to screw 34 being closest to that ground connection section 35f.

Figure 10:
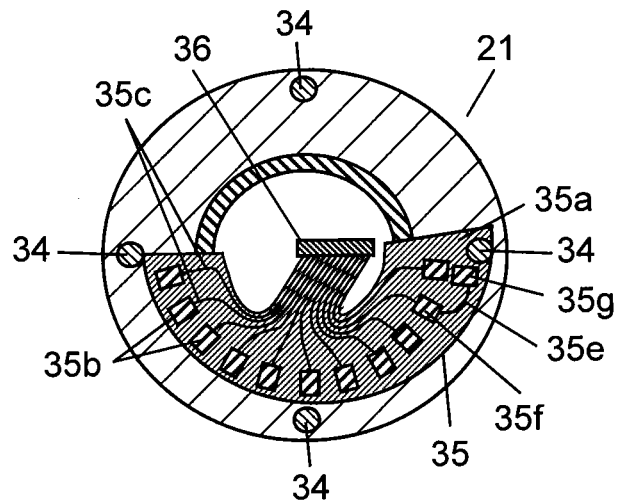
FIG. 10 is a plan view of a lens mount, seen from the lens barrel side, in an interchangeable lens unit according to still another embodiment of the present invention.

Further, as shown in FIG. 10, such a configuration may also be formed where conductive contact section 35g is provided so as to be adjacent to screw 34 being closest to ground connection section 35f, and that conductive contact section 35g and ground connection section 35f are connected to each other by extended wiring pattern 35e. In this case, by fixing of lens mount 21 to lens barrel 2a with screws 34, conductive contact section 35g provided adjacently to screw 34 is pressed to the metal portion of lens mount 21, thereby to electrically ground ground connection section 35f, provided in flexible cable 35, on the metal portion of lens mount 21 through extended wiring pattern 35e and conductive contact section 35g.

INDUSTRIAL APPLICABILITY

As thus described, the present invention is a useful invention in seeking reduction in unwanted radiation noise in a lens interchangeable digital camera and an interchangeable lens unit.

| REFERENCE MARKS IN THE DRAWINGS | |
|---|---|
| 1 | camera body |
| 2 | interchangeable lens unit |
| 3 | body housing |
| 4 | body mount |
| 5 | camera monitor |
| 6 | electronic viewfinder |
| 7 | operating section |
| 8 | image sensor |
| 9 | circuit board |
| 10 | camera controller |
| 11 | main circuit board |
| 12 | shutter unit |
| 15 | power supply block |
| 4a | terminal support section |
| 4b | body mount ring |
| 4c | connection terminal |
| 2a | lens barrel |
| 21 | lens mount |
| 21a | connection terminal |
| 21b | lens mount ring |
| 21c | terminal section |
| 21d | inner edge |
| 21e | screw hole |
| 22 | lens controller |
| 23 | diaphragm unit |
| 24 | driving section |
| 28, 29, 30 | lens group |
| 31 | circuit board |
| 32 | buffer member |
| 33 | screw receiving section |
| 34 | screw |
| 35 | flexible cable |
| 35a | insulating film |
| 35b | terminal connecting section |
| 35c | wiring pattern |
| 35d | conductive pad |
| 35e | extended wiring pattern |
| 35f | ground connection section |
| 35g | conductive contact section |
| 36, 37 | connector |

The invention claimed is:

1. A digital camera, comprising:
a camera body provided with a body mount; and
an interchangeable lens unit in which a lens mount includes a metal portion, fitted to the body mount is attached to a lens barrel, wherein
the interchangeable lens unit is provided with
   a circuit board arranged on an end face of the lens barrel on a lens mount side and installed with an electronic circuit device,
   a plurality of connection terminals which are arranged in an electrically insulating state in the lens mount, and serve to connect the electronic circuit device on the circuit board with an other electronic circuit device inside the camera body, and
   a wiring member for connecting the plurality of connection terminals with the circuit board, the wiring member being provided between the circuit board and the lens mount, and
the wiring member is provided with
   a plurality of ground connection sections which are connected to a ground pattern of the circuit board, and also electrically connected to a connection terminal that is to be a ground terminal among the plurality of connection terminals, and an extended wiring pattern connected to the plurality of ground connection sections grounding the plurality of ground connection sections on the metal portion of the lens mount, the ground connection sections and the extended wiring pattern are arranged between the circuit board and the lens mount.

2. The digital camera according to claim 1, wherein
the lens mount is fixed with screws to the end face of the lens barrel, and
the wiring member has conductive pads with which the screws come into electrical contact, and also connects the extended wiring pattern to the conductive pads.

3. The digital camera according to claim 1, wherein
the lens mount is fixed with screws to the end face of the lens barrel, and
the wiring member has a conductive contact section provided so as to be adjacent to the screw, and also connects the extended wiring pattern to the conductive contact section and fixes the lens mount to the lens barrel, thereby to bring the conductive contact section of the wiring member into electrical contact with the metal portion of the lens mount.

4. The digital camera according to claim 1, wherein
the circuit board is arranged on the end face of the lens barrel by being elastically supported by a buffer member.

5. An interchangeable lens unit in which lens mount includes a metal portion, fitted to a body mount of a camera body is attached to a lens barrel, comprising:

a circuit board arranged on an end face of the lens barrel on a lens mount side and installed with an electronic circuit device;

a plurality of connection terminals which are arranged in an electrically insulating state in the lens mount, and serve to connect the electronic circuit device on the circuit board with an other electronic circuit device inside the camera body; and a wiring member for connecting the plurality of connection terminals with the circuit board, the wiring member being provided between the circuit board and the lens mount, wherein the wiring member is provided with a plurality of ground connection section which are connected to a ground pattern of the circuit board, and also electrically connected to a connection terminal that is to be a ground terminal among the plurality of connection terminals, and an extended wiring pattern connected to the plurality of ground connection sections grounding the plurality of ground connection sections on the metal portion of the lens mount, the ground connection sections and the extended wiring pattern are arranged between the circuit board and the lens mount.

6. The interchangeable lens unit according to claim 5, wherein
the lens mount is fixed with screws to the end face of the lens barrel, and
the wiring member has conductive pads with which the screws come into electrical contact, and also connects the extended wiring pattern to the conductive pads.

7. The interchangeable lens unit according to claim 5, wherein
the lens mount is fixed with screws to the end face of the lens barrel, and
the wiring member has a conductive contact section provided so as to be adjacent to the screw, and also connects the extended wiring pattern to the conductive contact section and fixes the lens mount to the lens barrel for bringing the conductive contact section of the wiring member into electrical contact with the metal portion of the lens mount.

* * * * *